US007673738B2

(12) United States Patent  (10) Patent No.: US 7,673,738 B2
McConnell  (45) Date of Patent: Mar. 9, 2010

(54) STEERABLE/RETRACTABLE CARGO POWER DRIVE UNIT

(75) Inventor: Matthew S. McConnell, Costa Mesa, CA (US)

(73) Assignee: Ancra International LLC, Hawthorne, CA (US)

( * ) Notice: Subject to any disclaimer, the term of this patent is extended or adjusted under 35 U.S.C. 154(b) by 687 days.

(21) Appl. No.: 10/555,093

(22) PCT Filed: Apr. 30, 2004

(86) PCT No.: PCT/US2004/013623

§ 371 (c)(1),
(2), (4) Date: Oct. 18, 2006

(87) PCT Pub. No.: WO2004/098995

PCT Pub. Date: Nov. 18, 2004

(65) Prior Publication Data

US 2007/0057120 A1  Mar. 15, 2007

Related U.S. Application Data

(60) Provisional application No. 60/467,133, filed on May 2, 2003.

(51) Int. Cl.
*B64D 9/00* (2006.01)
(52) U.S. Cl. .................. 198/782; 198/788; 198/789
(58) Field of Classification Search .............. 198/780, 198/782, 788, 789, 790, 791
See application file for complete search history.

(56) References Cited

U.S. PATENT DOCUMENTS 3,690,440 A  9/1972  Macpherson (Continued)

FOREIGN PATENT DOCUMENTS

CA  2 373 692 A  8/2003

(Continued)

OTHER PUBLICATIONS

European Search Report issued in European Patent Application No. EP 02736520.4, mailed Mar. 12, 2009.

(Continued)

*Primary Examiner*—Douglas A Hess
(74) *Attorney, Agent, or Firm*—McDermott Will & Emery LLP

(57) ABSTRACT

A steerable, retractable power drive unit (SRPDU) is provided for installation into a transport vehicle for moving cargo in mutually perpendicular directions, such as a doorway area where containers need to move both laterally and longitudinally in a cargo vehicle. The SRPDU rotates upon application of an external command, to orient the drive unit in the required direction and to drive the cargo containers. Embodiments include an SRPDU comprising a stationary support for fixedly attaching to a vehicle structure, and a rotating support rotatably mounted to the stationary support. A drive assembly is movably mounted to the rotating support, the drive assembly comprising a roller and a first electronically controlled electric motor for rotating the roller. A lift assembly mounted to the drive assembly has a second electronically controlled electric motor for moving the drive assembly relative to the rotating support from a retracted position substantially within the rotating support to an extended position with the roller in driving abutment against the cargo. A rotation drive assembly has a third electronically controlled electric motor on the rotating support for rotating the rotating support relative to the stationary support. An electronic controller controls the first, second and third motors.

47 Claims, 10 Drawing Sheets

U.S. PATENT DOCUMENTS

| | | | |
|---|---|---|---|
| 3,978,975 A * | 9/1976 | Herbes et al. | 198/782 |
| 4,589,542 A | 5/1986 | Steadman | |
| 5,030,173 A | 7/1991 | Bryant | |
| 5,213,201 A * | 5/1993 | Huber et al. | 198/781.06 |
| 5,464,086 A | 11/1995 | Coelln | |
| 5,526,923 A * | 6/1996 | Johansson et al. | 198/722 |
| 5,547,069 A | 8/1996 | Pritchard | |
| 5,568,858 A * | 10/1996 | Thompson | 198/781.06 |
| 5,803,234 A | 9/1998 | Podkanski et al. | |
| 5,984,615 A | 11/1999 | Sundseth | |
| 6,254,033 B1 | 7/2001 | Huber et al. | |
| 6,279,730 B1 * | 8/2001 | Schreger et al. | 198/722 |
| 6,340,085 B1 * | 1/2002 | Huber et al. | 198/782 |
| 6,420,846 B1 * | 7/2002 | Wolfe | 318/463 |
| 6,834,758 B2 * | 12/2004 | Nguyen et al. | 198/782 |
| 7,014,038 B2 * | 3/2006 | Leingang et al. | 198/782 |
| 7,402,973 B2 * | 7/2008 | Hettwer | 318/563 |
| 7,472,867 B2 * | 1/2009 | Huber et al. | 244/118.1 |

FOREIGN PATENT DOCUMENTS

| | | |
|---|---|---|
| DE | 39 19 613 A | 12/1990 |
| EP | 0 497 045 A1 | 8/1992 |
| EP | 0 769 450 A3 | 4/1997 |
| EP | 0 937 643 A2 | 8/1999 |
| EP | 0 939 042 | 9/1999 |
| WO | WO 02/079071 A | 10/2002 |

OTHER PUBLICATIONS

European Search Report issued in European Patent Application No. EP 91 31 0772, dated May 21, 1992.

* cited by examiner

STEERABLE/RETRACTABLE CARGO POWER DRIVE UNIT

This application is the U.S. National Phase under 35 U.S.C. § 371 of International Application No. PCT/US2004/013623, filed Apr. 30, 2004, which in turn claims the benefit of U.S. Application No. 60/467,133, filed May 2, 2003, the disclosures of which Applications are incorporated by reference herein in their entirety.

FIELD OF THE INVENTION

The present invention relates to cargo conveying systems for use in moving cargo on a vehicle such as an aircraft. The present invention has particular applicability in roller drive systems in which a roller is urged upwardly against cargo to be conveyed when the system is activated and retracted when the system is deactivated.

BACKGROUND ART

Roller assemblies which are removably mounted on carriers attached to the floor of a vehicle are widely used for conveying cargo within such vehicles. These roller assemblies or "actuators" are intended for use in systems which involve the transport of commercial and military cargo containers commonly used in the air cargo, ground cargo (trucking), rail cargo and shipboard cargo industries. The actuator installs into a cargo transport vehicle, and provides motive force and holding (i.e., braking) for the containers within the vehicle.

The actuator, commonly called a power drive unit or powered drive unit (PDU), works in conjunction with external support equipment to facilitate the loading and unloading of the cargo containers into and out of the vehicle. The PDU typically incorporates a fixed frame or support base rigidly attached to the floor or floor structure of the cargo vehicle. A moving drive assembly is attached to the support base. The drive assembly includes drive roller or rollers for contacting the cargo containers and providing motive force to them by means of the frictional coefficient between an elastomeric roller surface and the container bottom, and a motor for rotating the drive roller. Cargo container bottoms are generally smooth, metallic coverings attached to a square or rectangular frame structure; however, they may also be made of non-metallic material such as wood or reinforced plastic.

The PDU also incorporates a lift mechanism which raises the drive assembly from its lowered position into abutment against the cargo container bottom, as by rotating cams on a common camshaft against reaction points or bearings in the support base. The lift mechanism provides the vertical force to the drive roller, which in turn provides the frictional force to drive the container. The lift mechanism also can be engaged to hold the container in place when the drive roller is not turning, to prevent the unintended motion of containers in the vehicle.

When drive and/or hold commands are removed from the PDU, the PDU drive assembly lowers to its retracted position. The cargo containers are typically supported by a plurality of free turning cylindrical rollers, ball transfer units or caster assemblies, which are collectively referred to as the conveyance hardware. When the PDU is retracted, the containers are free to move on the conveyance hardware, and are typically held in position during vehicle motion by latches, guides and other restraint hardware.

In areas requiring movement of containers in mutually perpendicular directions, such as a doorway area where containers need to move both laterally and longitudinally in a cargo vehicle, steerable PDU's are employed which rotate upon application of an external command, to orient the drive assembly in the required direction and to drive the cargo containers. Typical steerable PDUs are described in U.S. Pat. No. 3,978,975, and U.S. Pat. No. 4,589,542, both of which are incorporated herein by reference.

Prior art PDU's can involve complex mechanisms which are heavy, costly and difficult to repair or replace. However, regardless of their degree of complexity, prior art PDU's are limited in their operational flexibility under varying conditions, such as use in different vehicles or for different types of cargo containers or loading. As a result, they are not easily adaptable to different applications.

SUMMARY OF THE INVENTION

An advantage of the present invention is a steerable PDU which is faster, lighter in weight, less costly and has reduced power consumption compared with prior art actuators.

According to the present invention, the foregoing and other advantages are achieved in part by an apparatus for conveying cargo, the apparatus comprising a stationary support for fixedly attaching to a vehicle structure; a support base; a rotating support for fixedly mounting the support base, the rotating support being rotatably mountable to the fixed support; a drive assembly pivotably mounted to the support base for limited vertical movement substantially normal to the longitudinal axis of the support base, the drive assembly comprising a roller and a first electronically controlled electric motor for rotating the roller; a lift assembly comprising a second electronically controlled electric motor for moving the drive assembly relative to the support base from a retracted position substantially within the support base to an extended position with the roller in driving abutment against the cargo; a rotation drive assembly comprising a third electronically controlled electric motor for rotating the rotating support relative to the stationary support; and an electronic controller for controlling the first, second and third motors.

Additional advantages of the present invention will become readily apparent to those skilled in this art from the following detailed description, wherein only the preferred embodiment of the present invention is shown and described, simply by way of illustration of the best mode contemplated for carrying out the present invention. The advantages of the invention may be realized and obtained as particularly pointed out in the appended claims. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DESCRIPTION OF THE INVENTION

Figure 1:
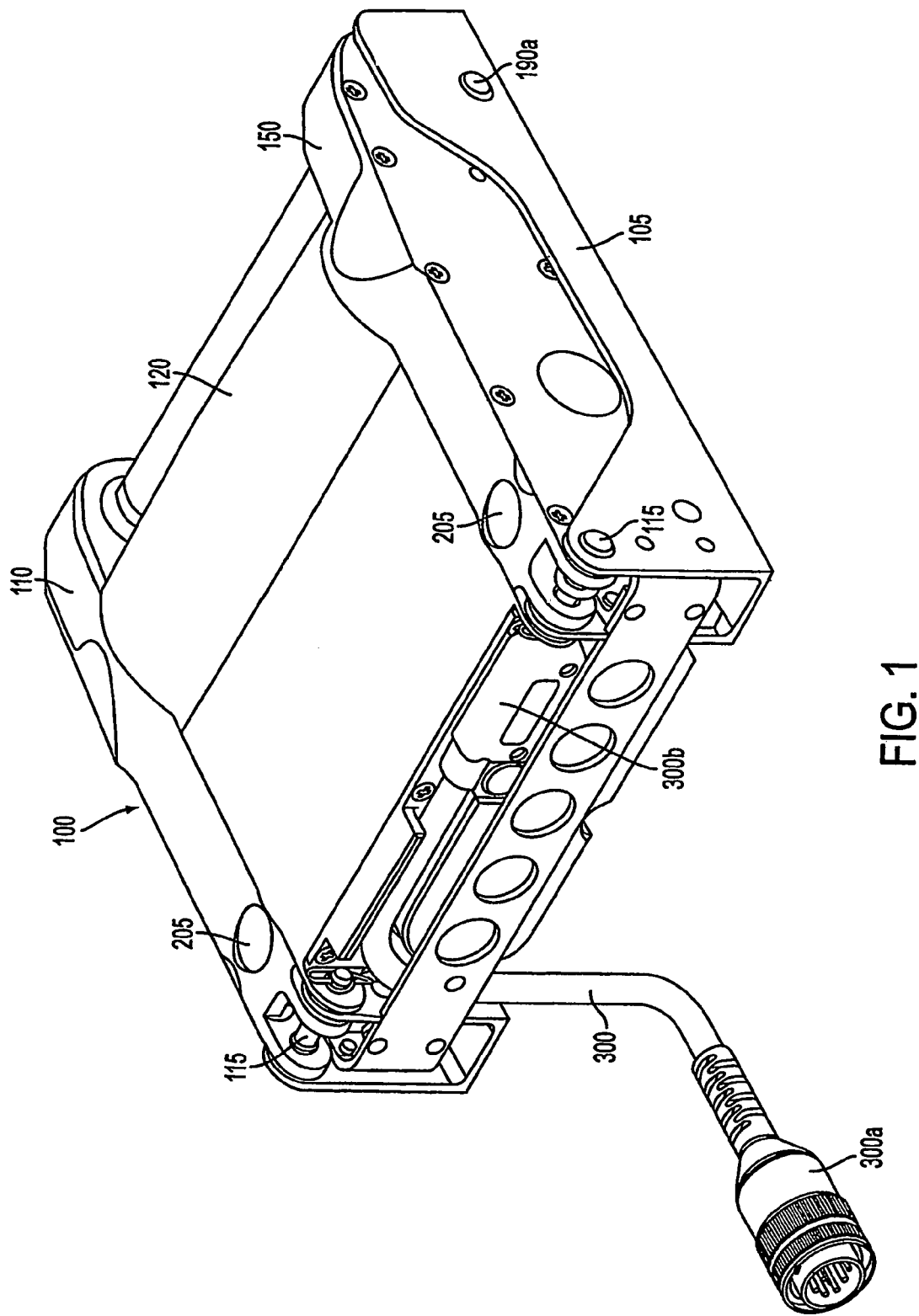
FIG. 1 is a perspective view of a PDU drive assembly in accordance with an embodiment of the present invention.
Figure 2A:
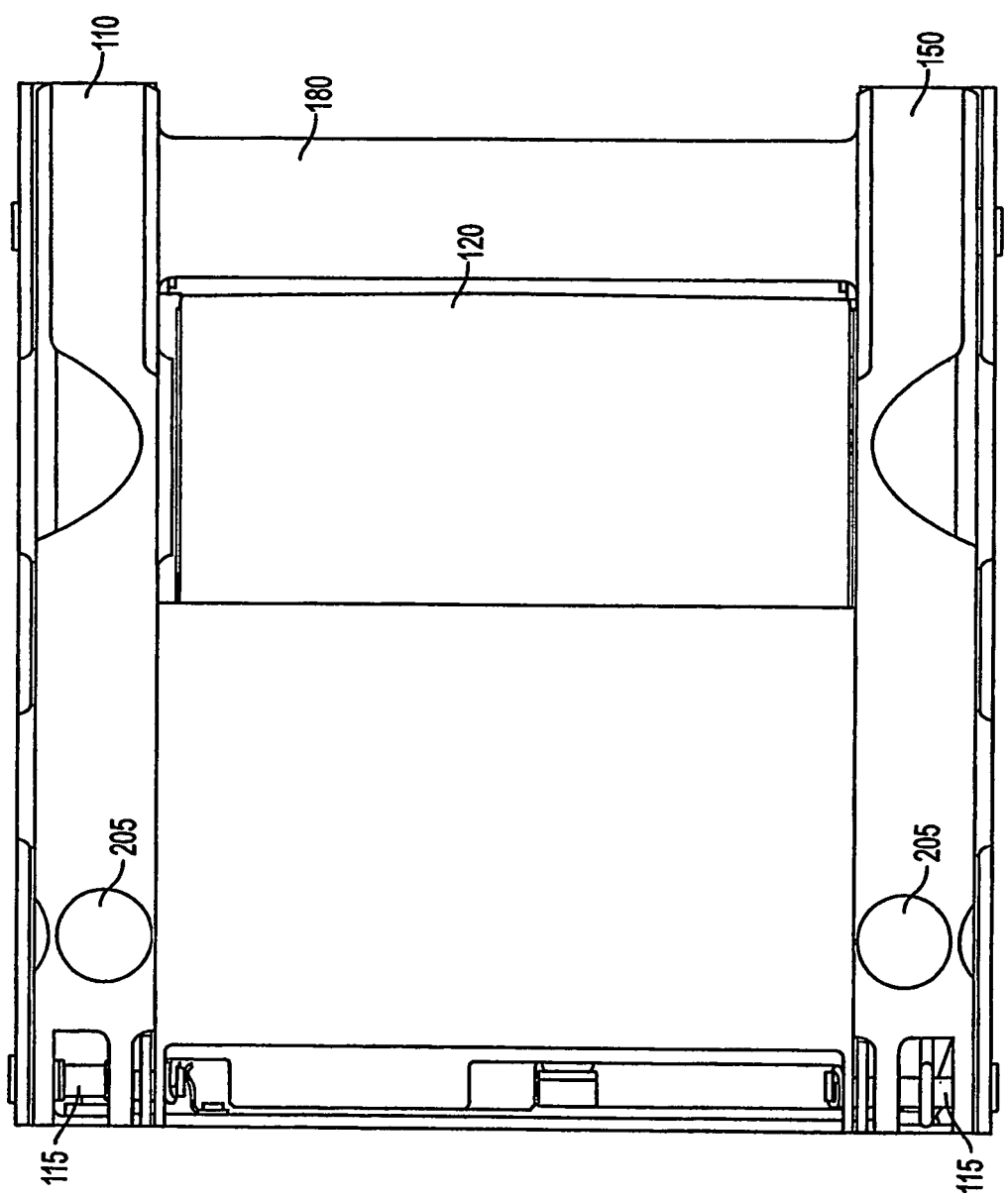
FIG. 2A is a top view of the apparatus of FIG. 1.
Figure 2B:
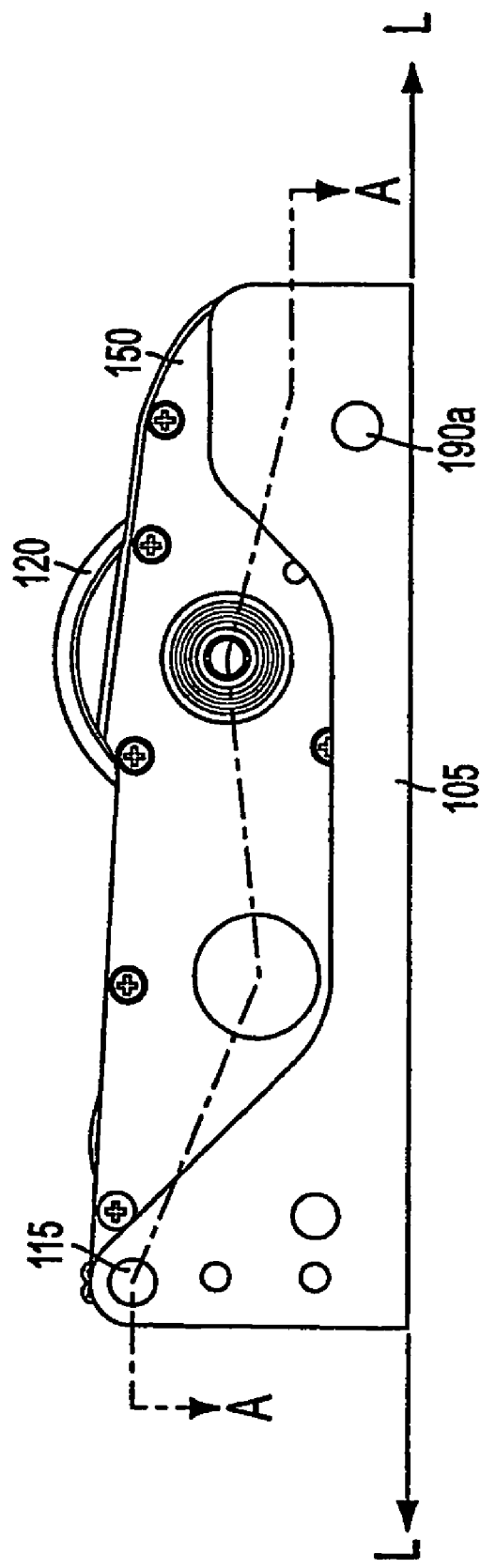
FIG. 2B is a side view of the apparatus of FIG. 1.

Conventional PDU's are mechanically complex and lack flexibility under varying operating conditions or vehicles. The present invention addresses and solves these problems of conventional PDU's.

The actuator of the present invention is commonly called a steerable, retractable power drive unit (SRPDU). It is designed to install into a transport vehicle in areas requiring movement of containers in mutually perpendicular directions, such as a doorway area where containers need to move both laterally and longitudinally in a cargo vehicle. The actuator rotates 90° upon application of an external command, to orient the drive assembly in the required direction and to drive the cargo containers. The actuator can also be commanded to intermediate angular positions to facilitate the rotation of containers. The actuator improves upon the current state of the art by providing rotary actuation and cargo transport which is faster, lighter weight, less costly and with reduced power consumption compared with other actuators in related applications.

The SRPDU of the present invention comprises a steering actuator (also known as a rotary actuator or rotary turntable) and a PDU drive assembly, such as the Model 92001-10 PDU drive assembly available from Ancra International of Hawthorne, Calif. ("Ancra") and described in Published International Patent Application WO 02/079071 A2 (PCT/US02/09476). The PDU drive assembly is mounted onto the steering actuator to form the SRPDU. The SRPDU is energized by external electrical power and is controlled by a combination of external electrical signals as well as internal sensors and logic. The steering actuator also acts as the interface between the transport vehicle and the PDU drive assembly, providing additional control logic to optimize the operation of the drive assembly. The SRPDU is designed to move cargo containers or pallets, which generally have smooth, metallic bottom coverings attached to a square or rectangular frame structure. The container bottoms can also be made of non-metallic materials such as laminated wood or reinforced plastic. Containers are typically supported by a plurality of free turning cylindrical rollers, ball transfer units or caster assemblies, which are collectively referred to as the conveyance hardware. When the PDU is retracted, the containers are free to move on the conveyance hardware, and are typically held in position during vehicle motion by latches, guides and other restraint hardware.

The PDU and its Functions

A PDU useable in the SRPDU present invention, as described in International Patent Application WO 02/079071 A2, includes two separate electronically controlled electric motors, one for the drive function and one for the lift function. These motors can both be permanent magnet alternating current (PMAC) motors, commonly referred to as "brushless DC" motors. The motors have their own control electronics, which are integrated into the PDU's electronics module. The dual, electronically controlled motor arrangement of this PDU provides independent, fully controllable power to both the drive and lift functions of the PDU. For example, the maximum drive torque and the maximum lift force of the PDU can be set and changed independently by the control software of the PDU, thereby providing maximum flexibility for using the actuator in various cargo applications. Furthermore, unlike prior art actuators, the PDU does not retract and then lift upon change of drive direction; the drive roller stays in constant contact with the container when the drive direction is reversed, thereby avoiding unwanted cargo movement when changing drive direction. Moreover, the use of electronically controlled motors in the actuator provides increased motive force, reduced power consumption and reduced weight compared to prior art actuators.

An embodiment of the PDU of the present invention will now be described with reference to FIGS. 1-4. A PDU 100 comprises a support base 105 of a metal such as aluminum, to which is mounted drive means, such as a drive assembly 110 pivotably mounted via pivot pins 115 for limited vertical movement substantially normal to the longitudinal axis L of support base 105. Drive assembly 110 comprises a drive roller 120 having an elastomeric outer surface, and means for rotating roller 120, such as an electronically controlled electric motor; e.g., a conventional PMAC motor 125 for rotating roller 120 via planetary gear assembly 130, pinion gear 135, idler gear 140 and output gear 145 (see FIG. 3).

Figure 3:
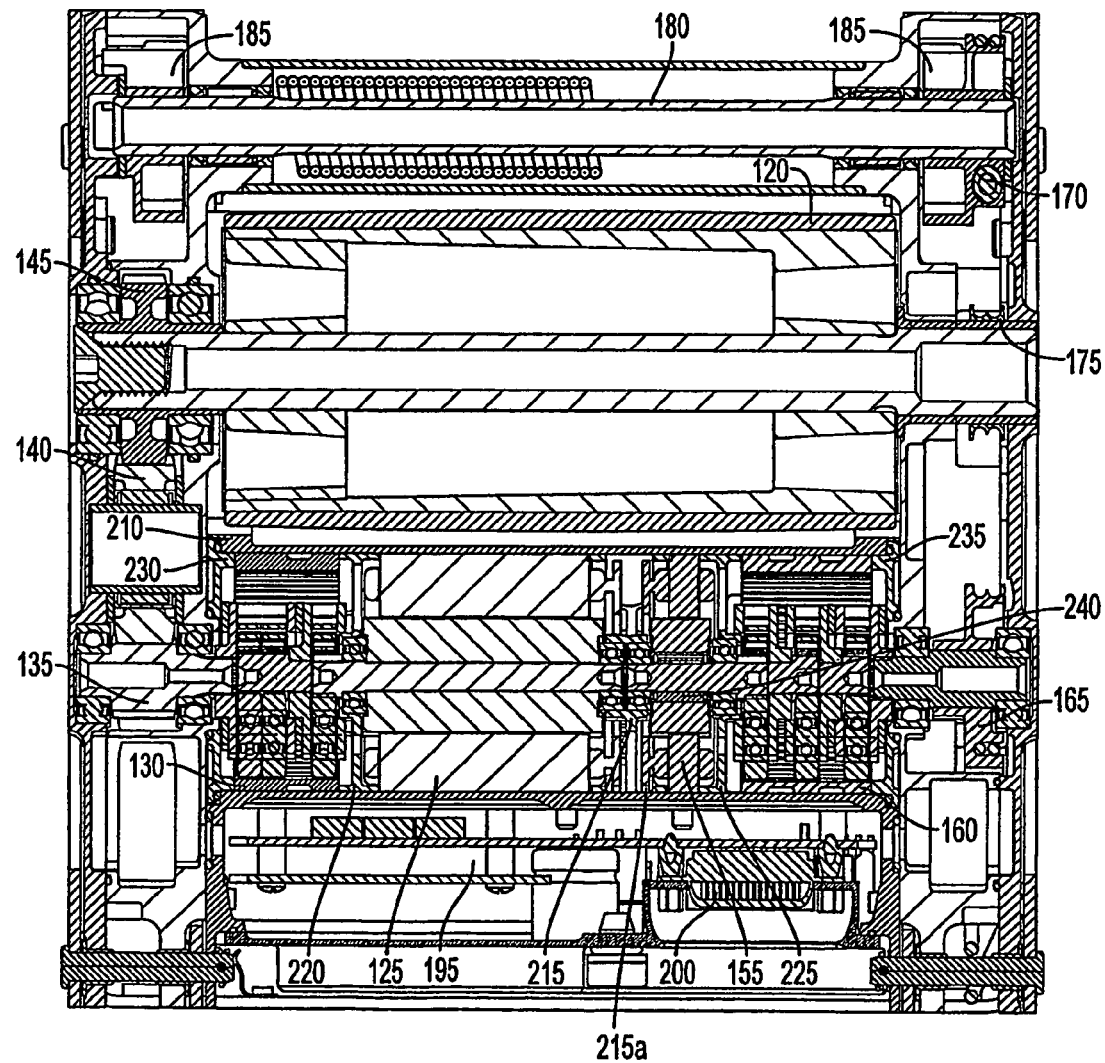
FIG. 3 is a cross-sectional view taken through line A-A of FIG. 2B.
Figure 4:
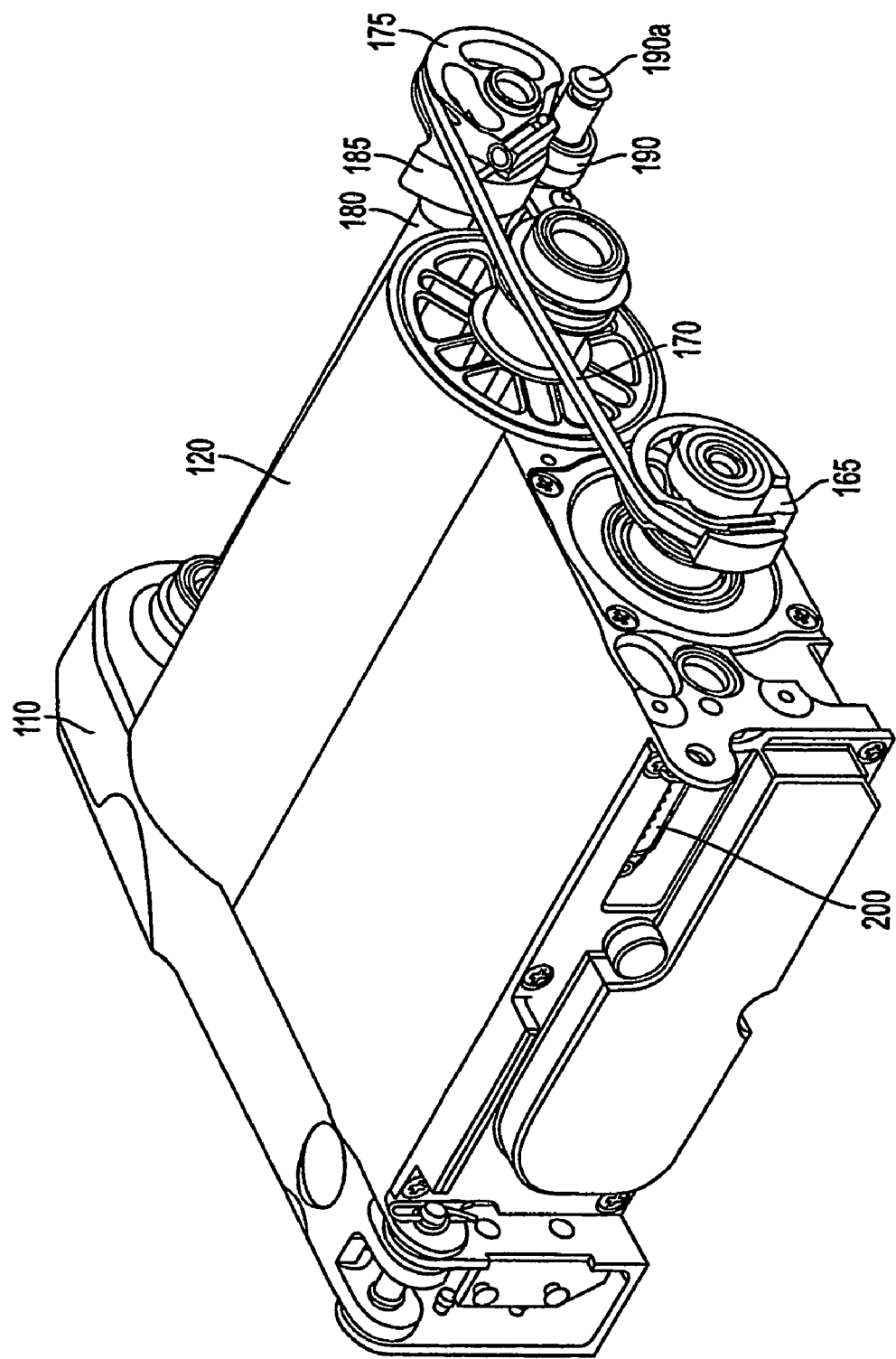
FIG. 4 is a perspective view of a lift apparatus in accordance with an embodiment of the present invention.

PDU 100 also incorporates lift means, such as lift assembly 150, for raising the drive means from its lowered position, as by rotating cams on a common camshaft against reaction points or bearings in the support base. The lift means provides vertical force to the drive roller, which in turn provides the frictional force to drive the container. More specifically, lift assembly 150 comprises an electronically controlled electric motor such as a conventional PMAC motor 155. As shown in FIGS. 3 and 4, lift motor 155 transmits power through a planetary gear assembly 160, a lift cable driver 165, lift cables 170 and a lift pulley 175 to a cam shaft 180 which carries a pair of cams 185 at either end. Cams 185 react against bearings 190 supported by lift reaction pins 190a in support base 105 to move drive assembly 110 relative to support base 105 around pivot pin 115 from a retracted position substantially within support base 105 (as shown in FIGS. 1-4) to an extended position wherein roller 120 is in driving abutment against the cargo (not shown). Lift motor 155 drives at approximately 11,000 rpm as drive assembly 110 is raising, and then operates in a stalled condition when drive roller 120 comes in contact with a container bottom, or when lift assembly 150 reaches its internal lift stop (not shown).

Lift assembly 150 incorporates tension cables 170 to transmit torque from lift motor 155 and gearing 160 to lift cams 185. In prior art actuators, the common means to provide torque to lift cams is to use gearing. The layout of the present invention is designed so that drive roller 120 is located between motors 125, 155 and lift cams 185. This layout provides optimum load distribution and minimizes the loads transmitted into support base 105. Torque transmission from the lift gearing 160 to cams 185 is accomplished by one or more multi-strand, steel or composite cables or straps 170, which are pulled by driver 165 at the output of lift gearing 160, and in turn pull cams 185 at a fixed radius. Cams 185 rotates against reaction bearings 190 in support base 105, thereby providing both vertical motion and vertical force to drive roller 120. Since an independent lift motor 155 is used, lift assembly 150 is designed to rotate in a single direction, regardless of the direction of drive roller rotation. The cable lift mechanism provides a lighter weight, lower cost solution which can be operated in an open environment, eliminating the need for sealed gearing at the output of the lift mechanism.

PDU 100 also comprises control means for independently controlling the lift means and the means for rotating the roller, such as an electronic controller 195 for electronically controlling drive motor 125 and lift motor 155 in a conventional manner as required by all electronically controlled motors, and for performing logical, memory and other operations which will be described in detail hereinbelow. Electronic controller 195 also includes built-in-test (BIT) functions to verify the proper operation of the actuator prior to use. Electronic controller 195 includes an input/output port 200, such as a serial port, for receiving signals from an external controller (not shown) and for sending signals to the external controller or other external devices, such as a computer. Electronic controller 195 further comprises a non-volatile memory that is used to collect and retain operating information of PDU 100, such as total operating time, total operating cycles, or any other data available to electronic controller 195. This data can be extracted via input/output port 200 for purposes of tracking reliability data or verifying usage.

Electronic controller 195 performs several critical functions. It controls independent lift and drive motors 125, 155, vehicle interface and logic functions, as well as providing electromagnetic interference control. Conventional power control modules for both motors 125, 155 are incorporated into electronic controller 195, which in one embodiment comprises 'cool' MOSFETs (metal oxide semiconductor field effect transistors) for power switching. These devices have advantageously low power dissipation, and are ideally suited to application in a PDU. Electronic controller 195 can also utilize advanced IGBTs (integrated gate bipolar transistors) for other critical switching functions. Each motor 125, 155 can be controlled by its own microprocessor within electronic controller 195 which stores software code, including the current and force limit settings for the motors, acceleration and deceleration rates, timeouts and delays, and any other necessary information. Electronic controller 195 can also include an EMI (electro-magnetic interference) filter to limit both the conducted EMI from PDU 100 as well as the EMI susceptibility of PDU 100 to within industry standards.

PDU 100 further includes two separate non-contacting sensors 205 which detect the presence of cargo containers above PDU 100. Sensors 205 can be one or more of several types of non-contacting sensors, e.g. infrared, ultrasonic, Hall effect, etc. The sensor cargo presence signals are received by electronic controller 195, which operates motors 125, 155 only if it receives the cargo presence signal from at least one of the sensors 205. Electronic controller 195 applies 'OR' logic to insure that PDU 100's motors 125, 155 operate when one sensor 205 experiences a failure (ON or OFF). The dual sensors provide added protection from contamination that might block one sensor 205 and render PDU 100 inoperable. Alternatively, electronic controller 195 can receive a manual override signal from the external controller through input/output port 200, and in response will operate motors 125, 155 regardless of whether the cargo presence signal is received from sensors 205. This manual override mode is used for system check-out and for sensor fault override.

In addition to cargo sensors 205, temperature sensors 205a are provided for monitoring the temperature of motors 125, 155 and the temperature of electronic controller 195. Electronic controller 195 also monitors motor operating parameters such as electrical current draw and speed of motors 125, 155 in a conventional manner employing sensors incorporated into motors 125, 155, such as rotor position sensors, which are required for operation of motors 125, 155. Using sensors 205a and its monitoring functions, electronic controller 195 provides internal self-protection against overheating, as well as protection against both drive motor and lift motor overloads. As discussed above, electronic controller 195 can provide feedback to the external controller through input/output port 200. Such feedback signals can include but are not limited to container presence, drive motor speed, drive roller speed, drive or lift motor current or corresponding loads, thermal protection status and a PDU identifier code.

Drive and lift motors 125, 155 and their associated gearing are designed to be installed into a center housing 210 of PDU 100 comprising a single, continuous bore. Center housing 210 contains both drive and the lift motors 125, 155, planetary lift gearing 160, planetary primary drive gearing 130, inboard bearing support 215, outboard bearing supports 220, 225 and end covers 230, 235. The advantages of this configuration are the ease of manufacture of the housing bore 210, the ease of assembly of components into a common bore, and the elimination of shimming during assembly. Shimming is a time consuming and error prone step in the assembly process which is avoided in this embodiment of the present invention. Shimming is eliminated in the inventive apparatus, despite the numerous axial components in the bore, because inboard bearing support 215 not only supports the inboard bearings of the rotors of both drive and lift motors 125, 155, but also provides an axial spring 215a which compensates for the tolerance stack-up in the bore of center housing 210. The assembled components are compressed against spring 215a and are retained by end covers 230, 235, thereby eliminating gaps between all the components in the bore of center housing 210.

Lift assembly 150 also includes a one-way clutch 240 between lift motor 155 and lift gearing 160 to eliminate the impact loads which would normally occur when drive assembly 110 retracts to the lowered position. During retraction, lift motor 155 accelerates to high speed; clutch 240 allows motor 155 to 'free-wheel' to a stop after lift cams 185 contact their down direction stop (not shown).

The performance and operational availability of a PDU is directly related to the size and durability of its drive roller(s). The size of the drive roller (based on its diameter and length) relative to the overall 'footprint' or top view of PDU 100 is advantageously maximized to insure good contact with the container, as well as long roller life. Drive roller 120 of PDU 100 encompasses approximately 23% of its support base 105's footprint (i.e., the length and width of support base 105), with a total surface area of approximately 48 square inches. By comparison, prior art PDUs used in air cargo have single or dual drive rollers that are about 12% to 17% of the footprint area, and total surface areas of 7 to 39 square inches.

The fixed support base of PDU 100 is designed to minimize weight and cost, yet still transfer the required loads from drive assembly 110 to the vehicle floor structure. This is accomplished by the layout and load distribution described above, which transfers the loads imparted to drive roller 120 through pivot pins 115 and lift cams 185 and into the corners of base 105 through reaction pins 190. This minimizes bending and deflection in support base 105, and allows base 105 to be manufactured with aluminum sheet stampings or thin-walled extrusions.

Several exemplary actuation functions or "modes" of PDU 100 will now be described. The "retracted mode" is the normal rest mode of PDU 100, wherein external power is removed, no drive or hold command is sent from the external controller, or no container is present (i.e., no cargo presence signal is generated by sensors 205). Retract mode facilitates the manual movement of containers, since drive assembly 110 is retracted below the conveyance plane.

In the "lift and drive mode", lift assembly 150 raises drive assembly 110 into contact with a container and drive roller 120 rotates to move the container. A direction command from the external controller and the cargo presence signal are required for this mode. Unlike typical prior art actuators having a single motor for both lifting and driving, PDU 100 does not retract and then lift upon a change of drive direction. Rather, drive roller 120 stays in constant contact with the container when the drive direction is reversed, because electronic controller 195 causes drive motor 125 to reverse direction while maintaining lift assembly 150 in the extended position.

In the "hold mode", lift assembly 150 raises drive assembly 110 into contact with a container and drive roller 120 is restrained from rotating by drive motor 125 and its associated drive gearing 135, 140, 145. The hold function of the inventive PDU 100 does not require a separate brake (e.g., a friction-type brake), because drive motor 125 is locked electronically by electronic controller 195 to prevent rotation of drive roller 120. This mode is intended to stop and hold containers in position, and can be used continuously when power is available to PDU 100. The hold mode is selectable via a command from the external controller such that the operator can choose to have PDU 100 hold or retract when the drive command is removed. For example, a pin of input/output port 200 can be connected to the vehicle ground as a signal to electronic controller 195 that the hold mode is desired. This can be applied without operator input, such as when a cargo door of an airplane is opened and the PDU system is turned on, all PDU's are placed in hold mode. The hold mode is typically maintained by the airplane's logic controllers when AC power is interrupted. For example, the hold mode can be engaged by a relay in the airplane.

Unlike conventional actuators, PDU 100 has the ability to resume the container holding mode after AC power is removed and subsequently re-applied without operator input. This is particularly important in the air cargo industry, where AC power is typically supplied by a ground power cart, aircraft generators, or an aircraft auxiliary power unit (APU), and is subject to momentary interruption and re-application at any time. Conventional PDUs can lose contact with and control of the cargo container upon power interruption, because they retract immediately upon power interruption and require a drive command to be reapplied by the operator upon resumption of AC power delivery to resume holding (since they typically have a common lift and drive motor). In contrast, PDU 100 retracts upon interruption of AC power, but when power is reapplied, sensors 205 detect cargo above them, and electronic controller 195 sees the hold signal, because the hold mode was engaged by the aircraft controller prior to power interruption, as discussed immediately above. In response to the cargo presence signal and the hold signal, electronic controller 195 automatically causes lift assembly 150 to move from the retracted to the extended position and drive assembly 110 to hold the cargo in place. A drive signal from the operator is not necessary.

PDU 100 can further incorporate a traction and scrubbing control function, featuring sensors and logic which limit unnecessary scrubbing of the drive roller under parked or jammed containers, thereby avoiding excessive drive roller wear and motor overheating. When a container reaches its intended position against a latch or another container, it is said to be parked. Most conventional PDUs will continue to drive against a parked container until the drive command is removed, or until the PDU overheats. Some PDUs have incorporated 'time-outs' or container motion sensors to limit scrubbing under parked containers. However, time-outs do not allow the operator the flexibility to work with various sizes of containers, and motion sensors may not work well under wet or slow moving containers.

Electronic controller 195 of PDU 100 analyzes the amount of torque applied to drive roller 120 (which is proportional to drive motor 125's current draw) and the motor 125's run time to determine the instantaneous power consumption of drive motor 125. More particularly, electronic controller 195 includes conventional circuitry for measuring the electrical current draw of drive motor 125 and for monitoring the measured current draw. Electronic controller 195 compares a power consumption curve stored in its memory to the monitored current draw, and shuts off drive motor 125 when its power consumption exceeds this curve. Under high traction loads, the drive time is limited to reduce drive roller scrubbing. Under lighter loads, as are encountered with lightweight or wet containers, drive motor 125 runs as long as the drive command is applied. This logic reduces the likelihood of 'false trips', and lets drive motor 125 run long enough to 'squeegee' a wet drive roller and move wet containers.

Scrubbing (i.e., controlled roller wear) can be accomplished by turning off drive motor 125 when the accumulated energy delivered to drive roller 120 via drive motor 125 exceeds a preset limit. The accumulated energy ($E_{accumulated}$) is calculated by summing the total dissipated energy ($E_{dis}$) sampled over time. Dissipated energy is energy ($E_{in}$) that is being delivered to motor 125 in excess of a predetermined threshold energy value ($E_{th}$). Threshold and accumulated energy are programmable into electronic controller 195 for each PDU application and are governed by the following equations:

$$E_{in} = \int P_{in} dt = \int (I_s^2 * R_m) dt \quad (1)$$

$$E_{th} = \int P_{th} dt = \int (I_{th}^2 * R_m) dt \quad (2)$$

$$E_{dis} = E_{in} - E_{th} \quad (3)$$

$$E_{accumulated} = \Sigma E_{dis} dn \quad (4)$$

where:

$R_m$ = Motor resistance, normalized = 1

$I_s$ = Sampled current $P_{in}$ = Power into motor 125

$I_{th}$ = Threshold value determined for each application $P_{th}$ = Threshold power.

Figure 5A:
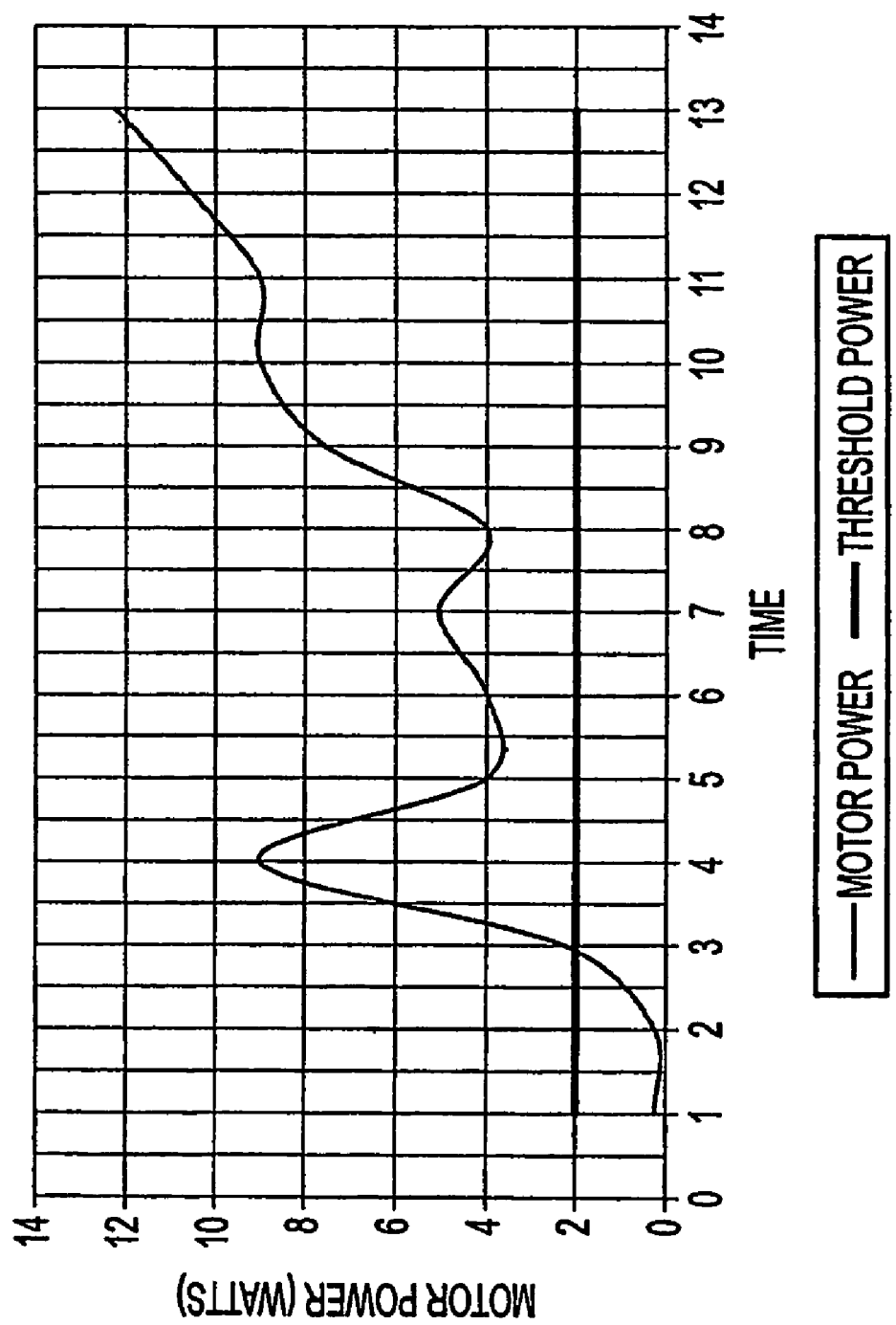
FIGS. 5A and 5B are graphical representations of a power consumption curve used in an embodiment of the present invention.
Figure 5B:
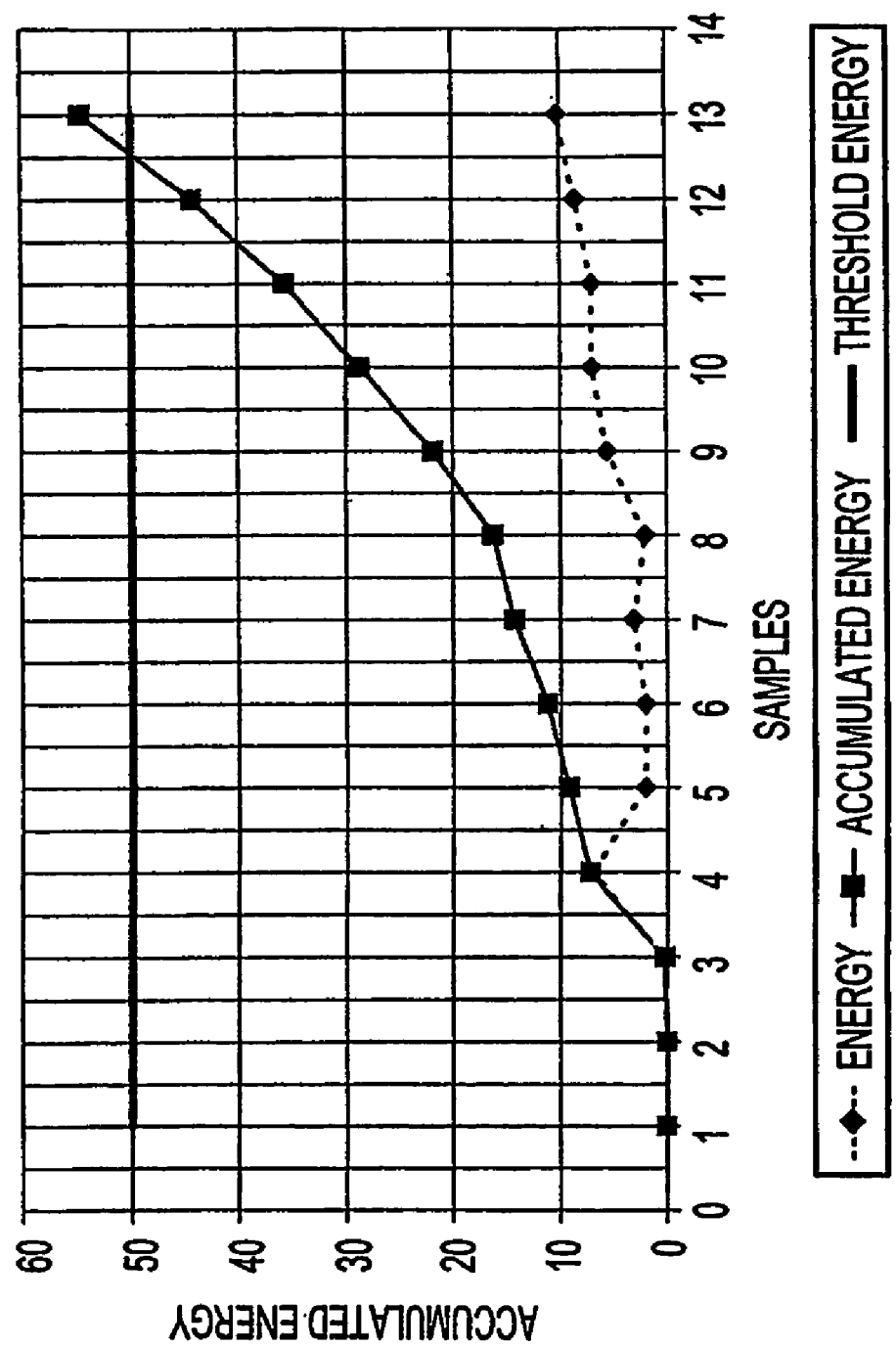
Figure 6:
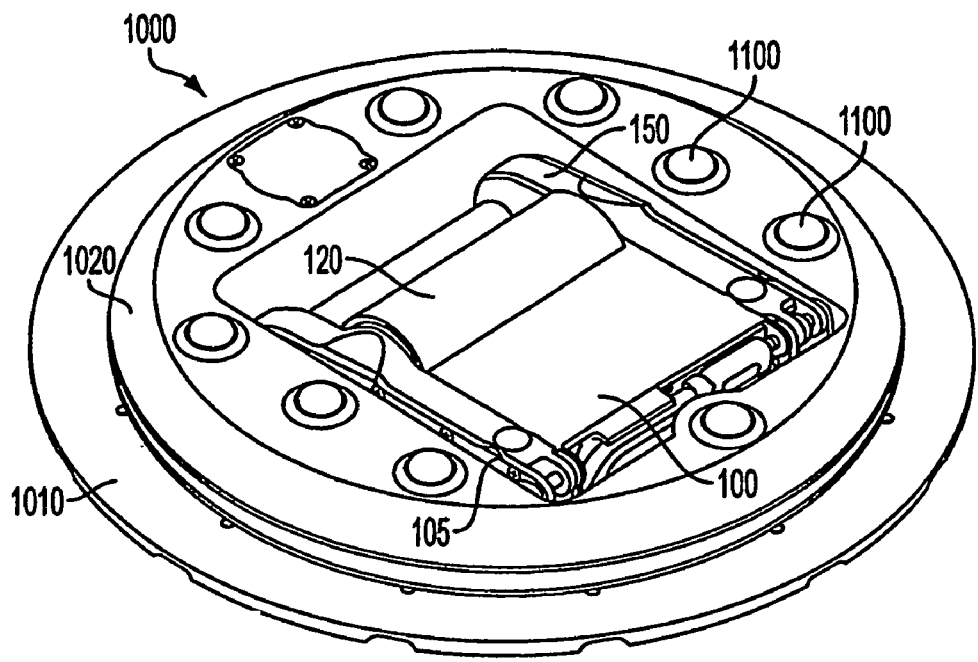
FIG. 6 is a top perspective view of a SRPDU drive assembly in accordance with an embodiment of the present invention.
Figure 7:
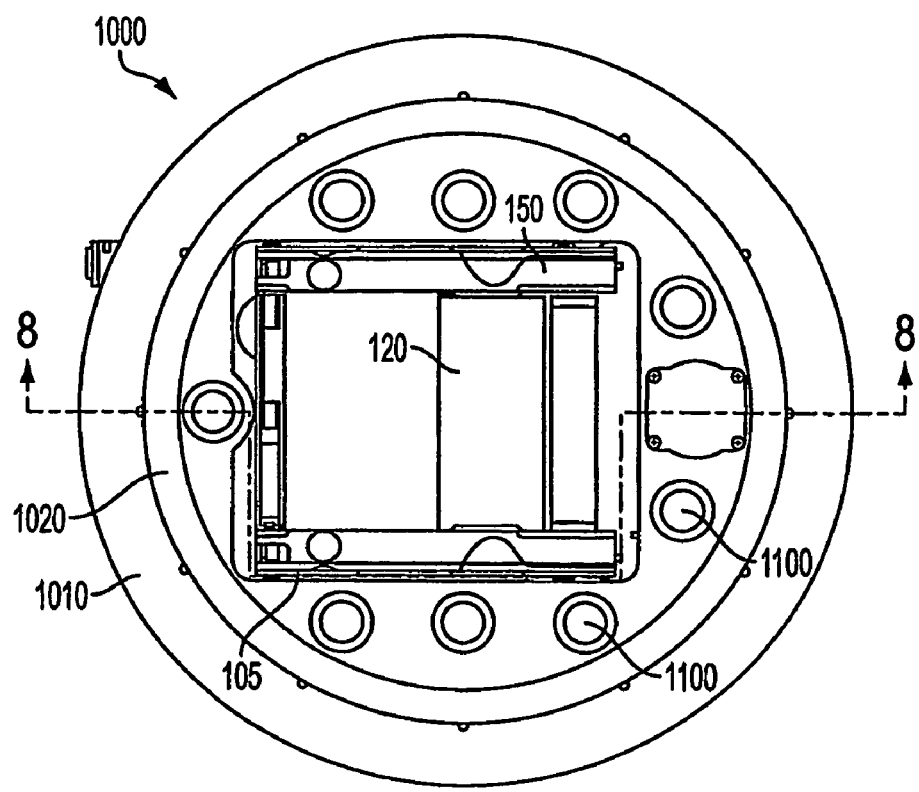
FIG. 7 is a top view of the apparatus of FIG. 6.

Sample power consumption curves are depicted in FIGS. 5A and 5B. FIG. 5A shows PDU energy usage with a variable load at drive roller 120, and FIG. 5B shows accumulated energy with a variable load at drive roller 120.

PDU 100 is designed to operate in a number of different vehicle applications, with no changes to the actuator. It can be pre-programmed to work in several applications where a different traction forces, lift forces or logic delays are required. Electronic controller 195 has sufficient memory to store multiple programs for multiple PDU applications. As discussed above, feedback signals can also be provided to an external controller. Any one of a plurality of different external controllers can be used with a single inventive PDU by using different electrical interface cables, such as cable 300 shown in FIG. 1. The interface cables attach to input/output port 200 but have a distinct vehicle interface connector, such as connector 300a, based on the controller application. Circuitry internal to the particular electrical interface cable, such as circuitry 300b, identifies the cable type to electronic controller 195 via input/output port 200, and in response electronic controller 195 selects and uses software specific to that application stored in its memory. Thus, the same PDU 100 can be installed in a different position or a different vehicle type, and work properly without any changes to the unit.

PDU 100, which can be incorporated into the inventive SRPDU described hereinbelow, features two separate permanent magnet brushless DC electric motors, one for the drive function and one for the lift function. The motors have their own control electronics, which are integrated into a PDU electronics module. The drive motor is current limited to control the maximum available drive torque, which can be varied for different cargo applications, along with the maximum lift force of the PDU, via control software. The dual motor arrangement provides independent, fully controllable operation of both the drive and lift functions of PDU 100. This independence and programmability provides maximum flexibility for using the inventive PDU in various applications.

The SRPDU and its Functions

As discussed above, the SRPDU rotary actuator of the present invention comprises a steering actuator (also known as a rotary actuator or rotary turntable) and a PDU drive assembly, such as PDU 100 described above with reference to FIGS. 1-5B, mounted onto the steering actuator. The inventive SRPDU incorporates three permanent magnet brushless DC motors to facilitate independent drive, lift and rotation functions. The drive and lift motors are located in the PDU drive assembly, while the rotation motor is located in the rotating support ring of the rotary actuator.

An SRPDU according to the present invention will now be described with reference to FIGS. 6-9. The inventive SRPDU 1000 comprises a stationary support 1010 which is fixedly attached to the vehicle structure, a rotating support 1020 which supports a support base 105 of a PDU 100, a rotation motor 1030, a geartrain 1040, 1050, and an electronic module 1060. Stationary support 1010 includes a plurality of sealed ball bearings 1070, 1080, which react the vertical and radial (horizontal) loads, respectively, imparted to SRPDU 1000 from cargo containers (not shown). Rotating support 1020 includes a conventional permanent magnet brushless DC motor as rotation motor 1030, which transmits rotary power through a multiple stage gear reduction. Rotation motor 1030 can be identical in design to the lift motor 155 of PDU 100 (see FIG. 3), resulting in parts commonality and cost savings.

Figure 8:
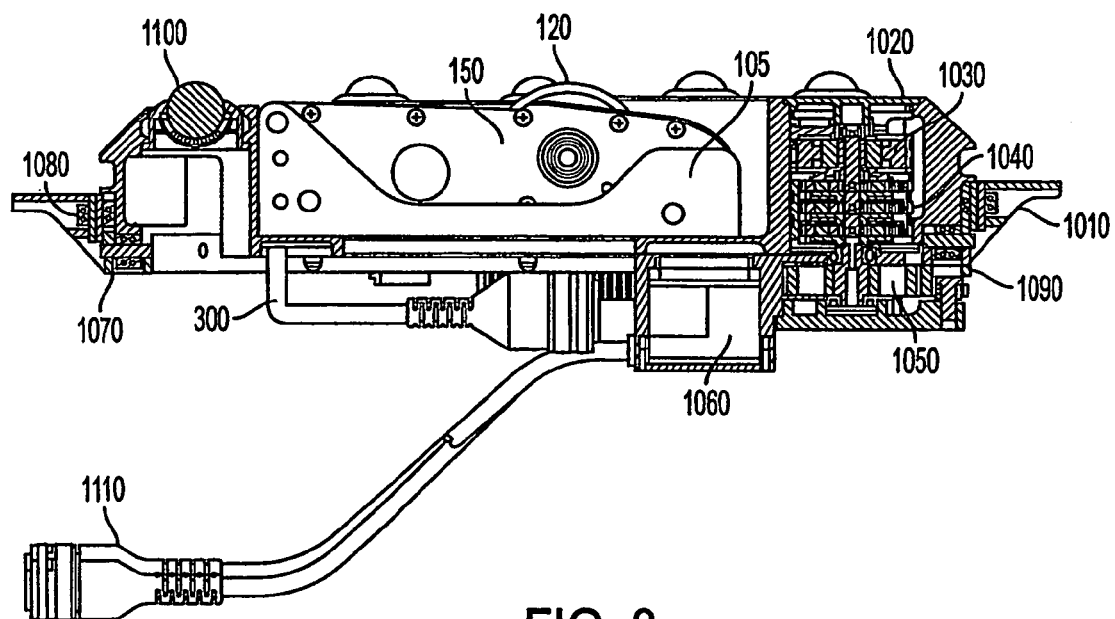
FIG. 8 is a cross-sectional view taken through line 8-8 of FIG. 7.
Figure 9:
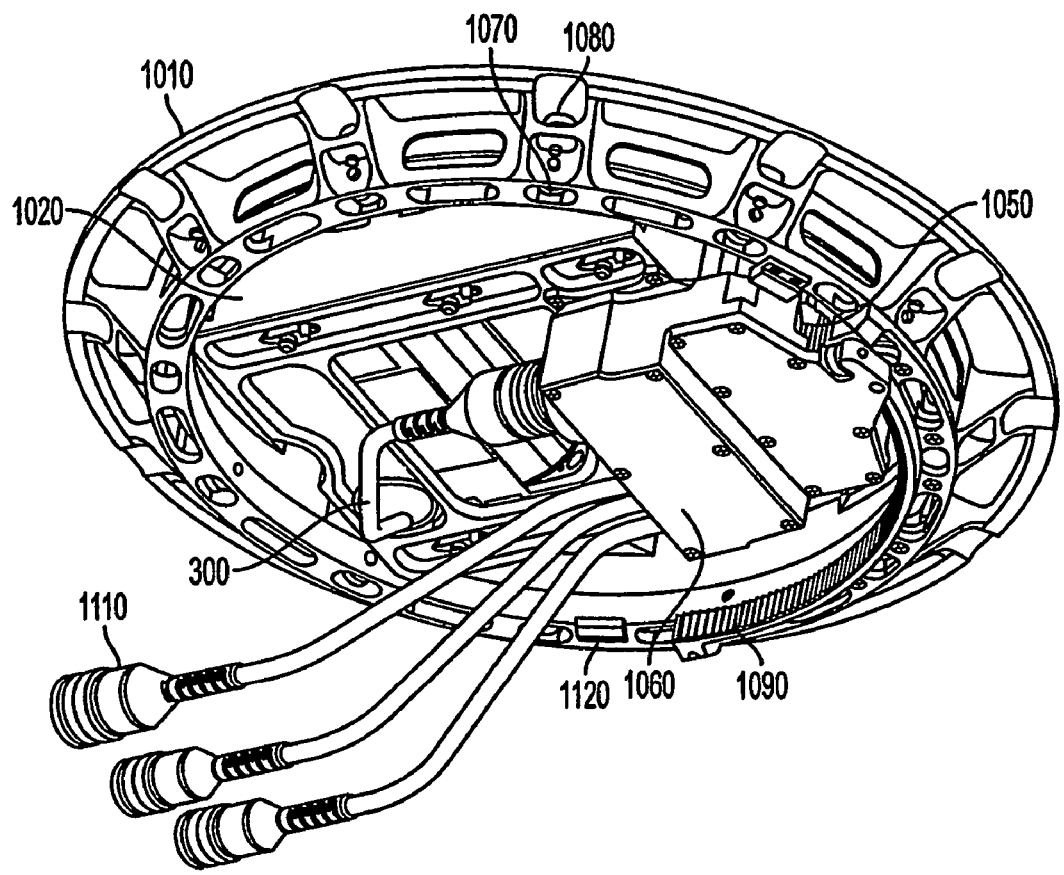
FIG. 9 is a bottom perspective view of the SRPDU drive assembly of FIG. 6.

In one embodiment of the present invention shown in FIG. 8, rotation motor 1030 is connected to a three stage planetary reduction gear set 1040. Planetary reduction gears 1040, bearings and other components can be identical to those used in PDU 100's lift geartrain 160 as described above with reference to FIG. 3. The final stage of gearing from rotation motor 1030 can comprise a spur pinion 1050 (e.g., mounted on the output shaft of reduction gear set 1040) that meshes with an internal spur sector (partial) gear 1090 mounted on rotating support 1020. This mesh facilitates the movement of rotating support 1020 relative to stationary support 1010. Output pinion gear 1050, which is located beneath SRPDU 1000 (see FIG. 9) and is exposed to the external environment, can be made from a conventional self-lubricating high strength plastic, such as acetal or phenolic plastic. Such a plastic output pinion is not affected by the environmental conditions of the cargo vehicle, and results in a weight and cost savings for the actuator. The high strength plastic material of output pinion 1050 may be reinforced with glass, cloth or carbon fibers. Sector gear 1090 (which mates with output pinion 1050) can be aluminum, which also saves cost and weight as compared to the steel gears commonly used in the prior art.

A cargo container over SRPDU 1000 is supported by a plurality of ball transfer units (BTUs) 1100 integrated into rotating support ring 1020. BTUs 1100 are conventional units, such as the Model 80334-10, available from Ancra, and function to protect PDU 100 from impacts with cargo containers, to support sagging cargo containers as they pass over SRPDU 1000, as well as to support cargo containers located over SRPDU 1000 while SRPDU 1000 is rotating. BTUs 1100 are located in a horizontal plane even with or slightly below the container conveyance plane established by BTUs 1100, the free-running rollers (not shown), and casters (not shown) installed in the cargo vehicle.

An electrical wire harness 300 of PDU 100 connects to SRPDU electronic control box 1060. The electronic control box 1060 in turn includes an electrical interface 1110 to an external controller (not shown), such as associated with the cargo vehicle. Electronic control box 1060 performs several critical functions. It controls rotation motor 1030, vehicle interface and logic functions, as well as providing electromagnetic interference control. A conventional power control module for rotation motor 1030 is incorporated into electronic control box 1060, which in one embodiment of the present invention comprises 'cool' MOSFETs (metal oxide semiconductor field effect transistors) for power switching. These devices have significantly lower power dissipation, and are ideally suited for application in an SRPDU. Electronic control box 1060 can also utilize advanced IGBTs (integrated gate bipolar transistors) for other critical switching functions.

Rotation motor 1030 is controlled by its own conventional microprocessor in electronic control box 1060 which stores software code, including the current (and force) limit settings for the motor, acceleration and deceleration rates, timeouts and delays, and any other necessary information. This programmable device has sufficient memory to store multiple programs for multiple SRPDU applications. Electronic control box 1060 further includes a conventional non-volatile memory that is used to collect and retain operating information of SRPDU 1000, which can include total operating time, total operating cycles, total rotation cycles or any other data available to the SRPDU electronics. This data can be extracted via a conventional serial connection for purposes of tracking reliability data or verifying usage.

An EMI (electro-magnetic interference) filter can also be included in electronic control box 1060 to limit both the conducted EMI from SRPDU 1000 as well as the EMI susceptibility of SRPDU 1000 to below industry standards. Electronic control box 1060 includes an environmentally sealed electronics enclosure, and is located on the underside of SRPDU 1000. A breather port is installed in the electronics enclosure to allow the pressure in the enclosure to equalize with the outside air, as well as to prevent the passage of moisture into the enclosure.

SRPDU 1000 further comprises conventional sensors for providing electronic control box 1060 signals indicative of container presence, temperature of the motors and the electronics, electrical current draw and rotation position. Conventional non-contacting (proximity) sensors 1120 are used to detect the 0° and 90° positions of rotating support 1020, and any intermediate position can also be detected by means of electronically counting the rotation motor 1030 revolutions. For example, conventional Hall-effect commutation sensors (not shown) in rotation motor 1030 can be provided to determine intermediate rotation positions of SRPDU 1000. Electronic control box 1060 can provide feedback to the external controller through SRPDU electrical interface 1110. Such feedback signals can include but are not limited to container presence, drive or rotation motor speed, drive roller speed, rotation position; drive, lift or rotation motor current or corresponding loads, thermal protection status and SRPDU drive assembly identifier code.

Using sensors and its monitoring function, electronic control box 1060 can provide internal self-protection functions such as thermal protection against overheating, and protection against drive, lift and rotation motor overloads. It also includes built-in-test-equipment (BITE) functions to verify the proper operation of the actuator prior to use.

Several exemplary actuation functions or "modes" of SRPDU 1000 will now be described. Of course, PDU 100 of SRPDU 1000 participates in performing many of the following functions. Since the functioning of PDU 100 has been described in detail hereinabove with reference to FIGS. 1-5B, such a discussion of the functions of PDU 100 will not be repeated here. However, all the features and advantages of PDU 100 described above can be included in inventive SRPDU 1000.

The "retracted mode" is the normal rest mode of SRPDU 1000, wherein external power is removed, no drive command is sent from the external controller, or when no container is present. Retract mode facilitates the manual movement of containers, since PDU 100 is retracted below the conveyance plane. A cargo container over SRPDU 1000 is supported by the plurality of ball transfer units (BTUs) 1100 integrated into SRPDU rotating support 1020.

In the "lift and drive mode", the lift assembly 150 of PDU 100 of SRPDU 1000 rises into contact with the container and drive roller 120 rotates to move the container. A direction command and a container sensed over SRPDU 1000 are required for this mode.

In the "sensor override mode", the lift assembly 150 of PDU 100 rises into contact with the container and drive roller 120 rotates to move the container. A manual override command and a direction command are required for this mode. The presence sensor status is ignored. This mode is used for system check-out as well as for sensor fault override.

In the "hold mode", lift assembly 150 of PDU 100 of SRPDU 1000 rises into contact with the container and drive roller 120 is restrained from rotating by the drive motor and gearing (see FIG. 3). This mode is designed to stop and hold containers in position, and can be used continuously when power is available to the system. The hold mode is selectable via external command such that the operator can choose to have SRPDU 1000 hold or retract when a drive command is removed. The hold mode is discussed in further detail hereinabove, including the present invention's ability to resume the container holding mode after AC power is removed and subsequently re-applied without operator input.

In the "rotation mode", when commanded by an external signal, SRPDU rotating support 1020 and PDU 100 rotate relative to stationary support 1010 to the position commanded. The SRPDU 1000 automatically stops rotation at the 0° and 90° positions, using integrated position sensors 1120, and intermediate positions can also be commanded, as discussed above. BTUs 1100 installed into rotating support 1020 are in contact with any container present above SRPDU 1000, and continue to support the container during rotation. Electronic control box 1060 controls SRPDU 1000 to rotate when PDU drive roller 120 is retracted; integrated BTUs 1100 support the cargo container over SRPDU 1000 during rotation.

The rotation motor 1030 incorporates braking technology similar to that of PDU 100's drive motor 125 (see FIG. 3 and description thereof) to stop and hold the angular position of SRPDU 1000 without the need for a mechanical brake. Specifically, rotation motor 1030 is locked electronically by electronic control box 160 in a conventional manner, to prevent rotation of rotating support 1020. This mode is intended to stop and hold containers in position, and can be used continuously when power is available to SRPDU 1000. As discussed above, a hold mode is selectable via external command such that the operator can choose to have the SRPDU hold when a drive command is removed. The hold mode discussed in further detail hereinabove includes the function of holding the angular position of SRPDU 1000 while holding containers in position using PDU 100. The hold mode further includes the ability to resume the container holding mode after AC power is removed and subsequently re-applied without operator input.

In further embodiments of the present invention, SRPDU 1000 incorporates the traction and scrubbing control functions of PDU 100, as described in detail hereinabove.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only one embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. An apparatus for conveying cargo, the apparatus comprising:
    a stationary support for fixedly attaching to a vehicle structure;
    a rotating support rotatably mounted to the stationary support; a drive assembly movably mounted to the rotating support, the drive assembly comprising a roller and a first electronically controlled electric motor for rotating the roller;
    a lift assembly comprising a second electronically controlled electric motor for moving the drive assembly relative to the rotating support from a retracted position substantially within the rotating support to an extended position with the roller in driving abutment against the cargo;
    a rotation drive assembly comprising a third electronically controlled electric motor for rotating the rotating support relative to the stationary support;
    an electronic controller for controlling the first, second and third motors; and
    a plurality of ball transfer units mounted on the rotating support for supporting the cargo and for preventing the cargo from contacting the roller when the drive assembly is in the retracted position.

2. The apparatus of claim 1, further comprising:
    a support base fixedly mounted to the rotating support;
    wherein the drive assembly is pivotably mounted to the support base for limited vertical movement substantially normal to the longitudinal axis of the support base; and wherein the lift assembly is for moving the drive assembly relative to the support base.

3. The apparatus of claim 2, wherein the lift assembly comprises a cam rotatably mounted in the drive assembly and rotated by the second motor for reaction against a bearing in the support base to provide the vertical movement to the drive assembly; wherein the drive roller is disposed between the second motor and the cam.

4. The apparatus of claim 3, wherein the bearing in the support base is supported by a pin disposed proximal to a corner of the support base.

5. The apparatus of claim 4, wherein the support base comprises aluminum.

6. The apparatus of claim 3, wherein the lift assembly further comprises a flexible tension cable connected to the second motor and the cam for transmitting torque from the second motor to the cam.

7. The apparatus of claim 6, wherein the flexible tension cable comprises a multi-strand steel cable.

8. The apparatus of claim 6, wherein the flexible tension cable comprises a composite cable or strap.

9. The apparatus of claim 6, wherein the second motor is for moving the drive assembly from the extended position to the retracted position, and the lift assembly comprises a one-way clutch between the second motor and the flexible tension cable for allowing the second motor to free-wheel after the second motor moves the drive assembly from the extended position to the retracted position.

10. The apparatus of claim 2, wherein the drive assembly comprises a continuous bore, and the first and second motors are mounted coaxially inside the bore.

11. The apparatus of claim 10, wherein the first and second motors each comprise a shaft and an inboard bearing for supporting the shaft;
and wherein the drive assembly further comprises an inboard bearing support for commonly supporting the inboard bearings of the first and second motors inside the bore.

12. The apparatus of claim 11, wherein the inboard bearing support comprises an axial spring for compensating for tolerance in the bore.

13. The apparatus of claim 11, further comprising primary drive gearing attached to the first motor shaft and lift gearing attached to the second motor shaft, wherein the bore is for housing the primary drive gearing and lift gearing.

14. The apparatus of claim 2, wherein the apparatus has a footprint defined by the length and width of the support base, and the roller has a footprint defined by the diameter and length of the roller, wherein the footprint of the roller is greater than 20 percent of the footprint of the apparatus.

15. The apparatus of claim 14, wherein the footprint of the roller is about 23 percent of the footprint of the apparatus.

16. The apparatus of claim 1, wherein the first, second and third motors are permanent magnet brushless DC motors.

17. An apparatus for conveying cargo, the apparatus comprising:
a stationary support for fixedly attaching to a vehicle structure;
a rotating support rotatably mounted to the stationary support; a drive assembly movably mounted to the rotating support, the drive assembly comprising a roller and a first electronically controlled electric motor for rotating the roller;
a lift assembly comprising a second electronically controlled electric motor for moving the drive assembly relative to the rotating support from a retracted position substantially within the rotating support to an extended position with the roller in driving abutment against the cargo;
a rotation drive assembly comprising a third electronically controlled electric motor for rotating the rotating support relative to the stationary support; and
an electronic controller for controlling the first, second and third motors;
wherein the third motor is fixedly mounted to the rotating support, the rotation drive assembly further comprising: a pinion gear connected to rotate with an output shaft of the third motor, and an internal spur sector gear fixedly mounted to the stationary support for meshing with the pinion gear for moving the rotating support relative to the stationary support when the pinion gear is rotated.

18. The apparatus of claim 17, further comprising a planetary reduction gear set connected between the output shaft of the third motor and the pinion gear.

19. The apparatus of claim 18, wherein the planetary gear set is a three stage gear set.

20. The apparatus of claim 17, wherein the pinion gear comprises a self-lubricating, high-strength plastic.

21. The apparatus of claim 20, wherein the pinion gear further comprises reinforcing glass, cloth or carbon fibers.

22. The apparatus of claim 17, wherein the spur sector gear comprises aluminum.

23. The apparatus of claim 1, wherein the electronic controller comprises an electrical interface;
wherein the apparatus is controllable by an external controller via the electrical interface; and
wherein the electronic controller is for sending feedback signals to the external controller, the feedback signals including at least one of an identifier code for the apparatus,
a cargo presence signal,
a first motor speed signal,
a third motor speed signal,
a roller speed signal, a first motor load signal, a second motor load signal, and
a thermal protection status signal.

24. The apparatus of claim 1, wherein the electronic controller comprises a non-volatile memory for storing operating information relating to the apparatus.

25. The apparatus of claim 24, wherein the operating information includes at least one of total operating time apparatus and total operating cycles.

26. The apparatus of claim 24, wherein the electronic controller comprises an electrical interface for downloading information from the non-volatile memory to an external computer.

27. The apparatus of claim 1, further comprising a rotation position sensor for detecting a radial reference position of the rotating support, and
a commutation sensor in the third motor for determining a radial position of the rotating support relative to the reference position.

28. The apparatus of claim 27, comprising first and second rotation position sensors to detect 0 degree and 90 degree positions of the rotating support, wherein the commutation sensor determines an intermediate position of the rotating support between the first and second rotation position sensors.

29. The apparatus of claim 28, wherein the commutation sensor is for counting revolutions of the third motor.

30. The apparatus of claim 29, wherein the commutation sensor comprises a Hall-effect sensor.

31. The apparatus of claim 1, wherein the electronic controller is for controlling the third motor to rotate the rotating support when the drive assembly is in the retracted position.

32. The apparatus of claim 1, wherein the electronic controller is for locking the third motor to prevent rotation of the rotating support.

33. The apparatus of claim 1, comprising a sensor for detecting the presence of the cargo above the drive assembly and sending a cargo presence signal to the electronic controller.

34. The apparatus of claim 33, wherein the electronic controller is for operating the first and second motors only if it receives the cargo presence signal.

35. The apparatus of claim 34, comprising an input device for sending a manual override signal from a user to the electronic controller, wherein the electronic controller is for operating the motors when it receives the manual override signal and does not process the cargo presence signal.

36. The apparatus of claim 33, wherein the electronic controller is for receiving a hold signal from an external controller; and
wherein the electronic controller is for causing the lift assembly to move from the retracted position to the extended position,
and the first motor to hold the roller stationary,
and the third motor to hold the rotating support stationary, when the electronic controller receives the hold signal and the cargo presence signal.

37. The apparatus of claim 1, comprising at least two sensors, each for detecting the presence of the cargo above the drive assembly and respectively sending a cargo presence signal to the electronic controller, wherein the electronic controller is for operating the first and second motors only if it receives the cargo presence signal from at least one of the sensors.

38. The apparatus of claim 37, comprising an input device for sending a manual override signal from a user to the electronic controller, wherein the electronic controller is for operating the motors when it receives the manual override signal and does not receive the cargo presence signal.

39. The apparatus of claim 33, wherein the sensor comprises a non-contacting sensor.

40. The apparatus of claim 39, wherein the sensor comprises a Hall effect sensor, an infrared sensor, or an ultrasonic sensor.

41. The apparatus of claim 1, wherein the electronic controller is for controlling the first motor to rotate the roller in a first direction or in a second direction opposite the first direction;
wherein when the lift assembly is in the extended position and the roller is rotating in the first direction, the electronic controller is for causing the first motor to rotate the roller in the second direction while maintaining the lift assembly in the extended position.

42. The apparatus of claim 1, comprising a circuit for measuring electrical current draw to the first motor, wherein the electronic controller is for monitoring the current draw of the first motor, and for removing power from the first motor when the current draw of the first motor exceeds a predetermined current draw for a predetermined time period.

43. The apparatus of claim 42, wherein the electronic controller comprises a memory for storing a power consumption curve representing a plurality of current draw values and corresponding time periods, and the electronic controller is for calculating the predetermined current draw and predetermined time period based on the power consumption curve.

44. The apparatus of claim 43, wherein the power consumption curve is for limiting the time of operation of the first motor to reduce scrubbing of the roller against the cargo.

45. The apparatus of claim 1, wherein the electronic controller is for providing control, programmable by a user, of at least one of first motor traction force second motor lift force, first, second and third motor speed, logic functions and electromagnetic interference control.

46. The apparatus of claim 1, comprising first, second and third motor temperature sensors, each for sending a respective motor temperature signal to the electronic controller.

47. The apparatus of claim 1, comprising: an input/output port of the electronic controller; and
an interface cable for connecting to the input/output port and to one of a plurality of different external controllers for controlling the apparatus, the interface cable having circuitry for identifying the one external controller to the electronic controller; wherein the electronic controller is for selecting and using software specific to the one external controller responsive to the cable circuitry.

* * * * *